(12) United States Patent
Hui et al.

(10) Patent No.: US 10,079,504 B2
(45) Date of Patent: Sep. 18, 2018

(54) FLOATING POWER SUPPLY FOR A BODY OF WATER AND METHOD THEREFOR

(71) Applicant: Wing-Kin Hui, Hong Kong (CN)

(72) Inventors: Wing-Kin Hui, Hong Kong (CN); Wing-Tak Hui, Hong Kong (CN); Andrew Hui, San Jose, CA (US)

(73) Assignee: Compurobot Technology Company, Guangdong, Dongguan (CN)

( * ) Notice: Subject to any disclaimer, the term of this patent is extended or adjusted under 35 U.S.C. 154(b) by 137 days.

(21) Appl. No.: 15/226,550

(22) Filed: Aug. 2, 2016

(65) Prior Publication Data

US 2018/0041068 A1 Feb. 8, 2018

(51) Int. Cl.
| | |
|---|---|
| H02J 7/35 | (2006.01) |
| B63B 35/44 | (2006.01) |
| H02S 40/38 | (2014.01) |
| H02S 10/40 | (2014.01) |
| H02J 7/00 | (2006.01) |
| F21V 31/00 | (2006.01) |
| F21L 4/08 | (2006.01) |

(52) U.S. Cl.
CPC .............. *H02J 7/355* (2013.01); *B63B 35/44* (2013.01); *F21L 4/08* (2013.01); *F21V 31/00* (2013.01); *H02J 7/0042* (2013.01); *H02J 7/0052* (2013.01); *H02S 10/40* (2014.12); *H02S 40/38* (2014.12); *B63B 2035/4453* (2013.01); *H02J 2007/0059* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,059,296 | A * | 10/1991 | Sherman | C02F 1/4602 204/229.8 |
| 5,362,267 | A * | 11/1994 | Forrest | B63B 22/166 362/341 |
| 9,502,907 | B2 * | 11/2016 | Potucek | H02J 5/005 |
| 9,631,388 | B2 * | 4/2017 | Hui | E04H 4/1281 |
| D794,160 | S * | 8/2017 | Hui | D23/207 |
| D806,931 | S * | 1/2018 | Hui | D26/102 |
| D806,932 | S * | 1/2018 | Hui | D26/102 |
| D806,933 | S * | 1/2018 | Hui | D26/102 |
| 2004/0173542 | A1 * | 9/2004 | Porat | C02F 1/78 210/760 |
| 2013/0206660 | A1 * | 8/2013 | Hui | E04H 4/1281 210/167.11 |
| 2017/0159927 | A1 * | 6/2017 | Hui | F21V 31/00 |

FOREIGN PATENT DOCUMENTS

| | | | | |
|---|---|---|---|---|
| EP | 3179012 A2 * | 6/2017 | | F21V 31/00 |
| EP | 3179012 A3 * | 8/2017 | | F21V 31/00 |

\* cited by examiner

*Primary Examiner* — Lisa Lea Edmonds
(74) *Attorney, Agent, or Firm* — Weiss & Moy, P.C.; Jeffrey D. Moy (57) ABSTRACT

A floating power supply for a body of water has a flotation unit. A power supply circuit housed within the flotation unit, wherein the power supply circuit provides power to a device within the body of water while untethered to a power source external of the body of water.

20 Claims, 13 Drawing Sheets

FIG. 13

FLOATING POWER SUPPLY FOR A BODY OF WATER AND METHOD THEREFOR

TECHNICAL FIELD

The present application generally relates to swimming pool devices, and more specifically, to a mobile floating power supply to power devices in a swimming pool or other bodies of water wherein the mobile floating power supply is not tethered to a power supply outlet external to the body of water.

BACKGROUND

Swimming pool cleaning devices (hereinafter pool cleaners) are used for maintaining residential and commercial swimming pools in a clean and attractive condition. Pool cleaners have been developed for cleaning and/or dislodging settled debris from the floor and side wall surfaces of the swimming pool, thereby substantially reducing the need for manual vacuuming and/or brushing of the floor and side wall surfaces of the swimming pool.

Some swimming pool cleaning devices may be powered by a floating power supply which floats on a water surface of the swimming pool. A power cable may be used to connect the swimming pool cleaning device to the floating power supply. The floating power supply is generally coupled to a main power supply source located external of the swimming pool. A main power cable may be used to couple the floating power supply to the main power supply source.

Unfortunately, the main power cable is generally laid across the deck of the swimming pool. Not only is this unsightly, but it poses a hazard to those around the swimming pool. The main power cord may pose a tripping hazard to those walking around the swimming pool. Further, since the main power cord generally has to be long enough to not limit where the swimming pool cleaning device can be used in the swimming pool, those around the swimming pool may get tangled within the main power cord thereby posing not only a tripping hazard but a potential choking hazard.

Therefore, it would be desirable to provide a system and method that overcomes the above.

SUMMARY

In accordance with one embodiment, a floating power supply for a body of water is disclosed. The floating power supply has a flotation unit. A power supply circuit housed within the flotation unit, wherein the power supply circuit provided power to a device within the body of water while untethered to a power source external of the body of water.

In accordance with one embodiment, a floating power supply for a body of water id disclosed. The floating power supply has a flotation unit. A power supply circuit is housed within the flotation unit, wherein the power supply circuit provides power to a device within the body of water while untethered to a power supply source external of the body of water. The power supply circuit has a control panel attached to the flotation unit. A controller is coupled to the control panel and housed with the flotation unit. A power supply circuit is coupled to the controller and housed with the flotation unit, wherein an output of the power supply circuit is regulated. The power supply circuit has a rechargeable power supply. A waterproof outlet is coupled to the power supply circuit and to the flotation unit.

In accordance with one embodiment, a floating power supply is disclosed. The floating power supply has a housing having a sub-housing extending down from a bottom section of the housing. A tubular member extends down from the housing and is in communication with an interior of the housing. A cover is positioned over the sub-housing and forms a watertight seal. A securing device attaches the cover to the tubular member forming the watertight seal. a flotation device is formed around a perimeter of the housing. A power supply circuit is positioned within housing. The power supply circuit provides regulated power to a device within the body of water while untethered to a power supply source external of the body of water. The power supply circuit has a rechargeable power supply.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary device and method provide a floating power supply for a swimming pool, spa, garden pond, fishpond and other water features (hereinafter swimming pool). The floating power supply may be used to power different devices in the swimming pool such as a swimming pool cleaning device, a lighting element or other devices requiring a power source. The floating power supply provides power to these devices without being tethered to a power supply outlet external to the swimming pool.

Referring to FIGS. 1-6, a floating power supply 10 may be seen. The floating power supply 10 may have a flotation unit 11. The flotation unit 11 may be configured to float on a top surface of water within a swimming pool or other water feature. The flotation unit 11 have a housing 12. The housing 12 may be configured to float on a top surface of the water. The housing 12 may have a hollow interior section 12A which may provide the buoyancy to keep the power supply 10 afloat. In the present embodiment, the housing 12 is cylindrical in shape, however this is shown as an example and should not be seen in a limiting manner. A tubular member 12B may extend down from a central bottom area of the housing 12. The tubular member 12B may provide access to the interior section 12A of the housing 12.

A sub-housing 14 may be coupled to the housing 12. In accordance with one embodiment, the sub-housing 14 may be coupled to the distal end of the tubular member 12B. The sub-housing 14 may be used to store and hold a power supply circuit 16. The sub-housing 14 may have a bottom surface 14G. Sidewalls 14C extend up from the bottom surface 14G forming a hollow interior area 14B having an open top surface 14A. A plurality of leg members 14D may rise up from a top edge of a sidewall 14C forming part of the sub-housing 14. At a distal end of each leg member 14D is a tab member 14E that extends away from the interior area 14B of the sub-housing 14. When securing the sub-housing 14 to the distal end of the tubular member 12B, the leg members 14D may extend up into an interior of the tubular member 12B. The tab member 14E may engage a bottom surface of the housing 12 where the tubular member 12B extends down from the central bottom area of the housing 12 securing the sub-housing 14 to the tubular member 12B of the housing 12.

A cover 18 may be formed around the sub-housing 14. The cover 18 may be used to prevent water from entering into the sub-housing 14 thereby protecting the power supply circuit 16 from damage. The cover 18 may be similar in shape to the sub-housing 14 but having a wider perimeter to fit around the sub-housing 14.

A securing device 20 may be used to attach the cover 18 to the tubular member 12B of the housing 12. The securing device 20 may form a watertight seal thereby preventing water from entering into the area between the cover 18 and the sub-housing 14. In accordance with one embodiment, the securing device 20 may be formed of a collar 22. The collar 22 may have threading 24 formed around an inner perimeter thereof. The threading 24 may engage threading 26 formed on an outer perimeter of the tubular member 12B of the housing 12 thereby securing the cover 18 to the tubular member 12B of the housing 12. A gasket 28 may be positioned between the tubular member 12B and the sub-housing 14. The gasket 28 may be used to prevent leakage from or into the area between the cover 18 and the sub-housing 14.

A flotation device 29 may be formed around the housing 12. The flotation device 29 may enhance the ability of the housing 12 and hence the illumination device 10 to float. The flotation device 29 may be an air bladder or similar device formed around an outer perimeter of the housing 12. In the present embodiment, the flotation device 29 may take a form of a circular ring. However, this is shown as an example and should not be seen in a limiting manner. One or more attachment devices 30 may be used to secure the flotation device 28 to the housing 12. The attachment device 30 may be locking blocks 30A, screws or similar devices.

Figure 1:
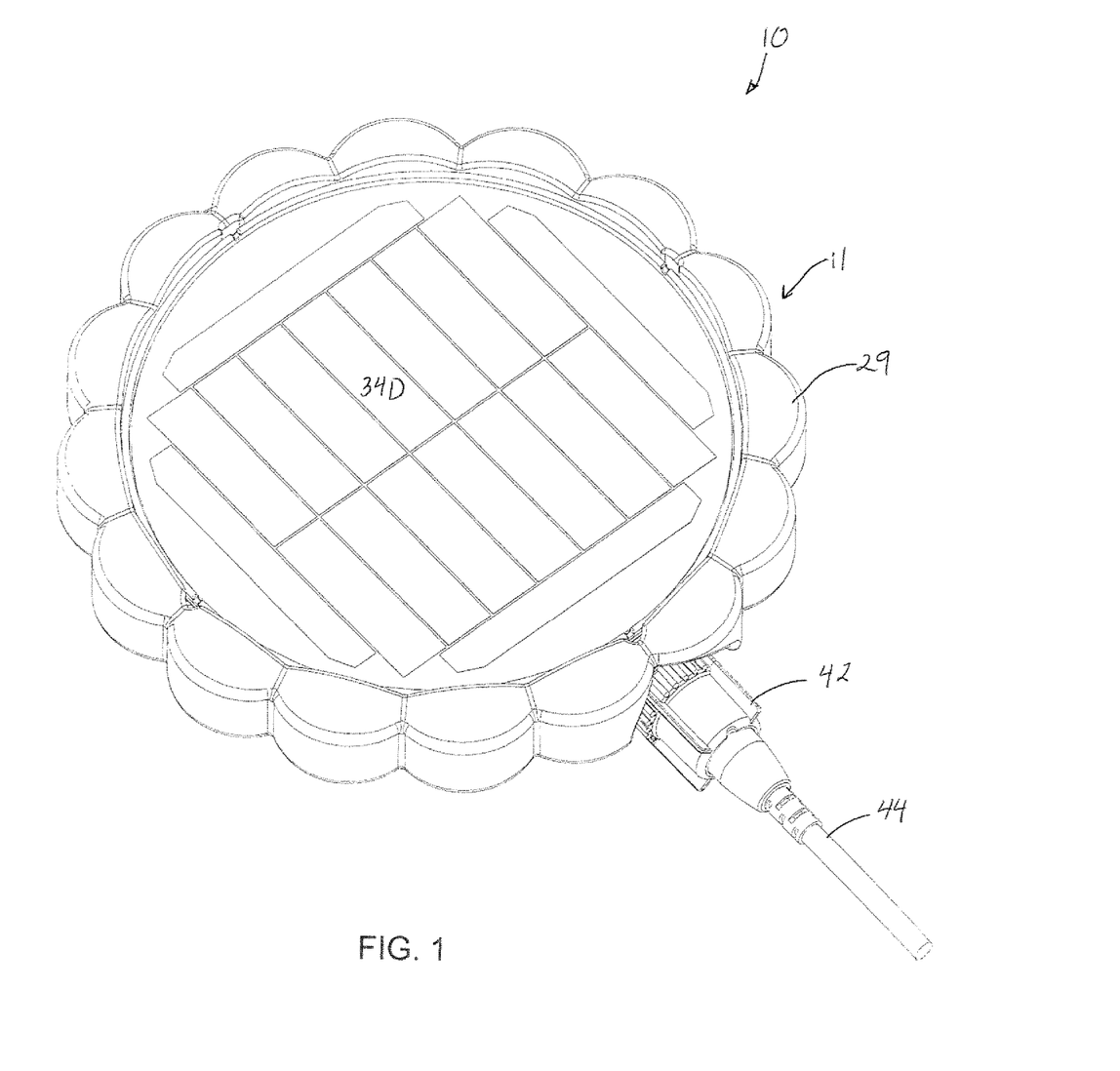
FIG. 1 is a top prospective view of a floating power supply in accordance with one aspect of the present application.
Figure 2:
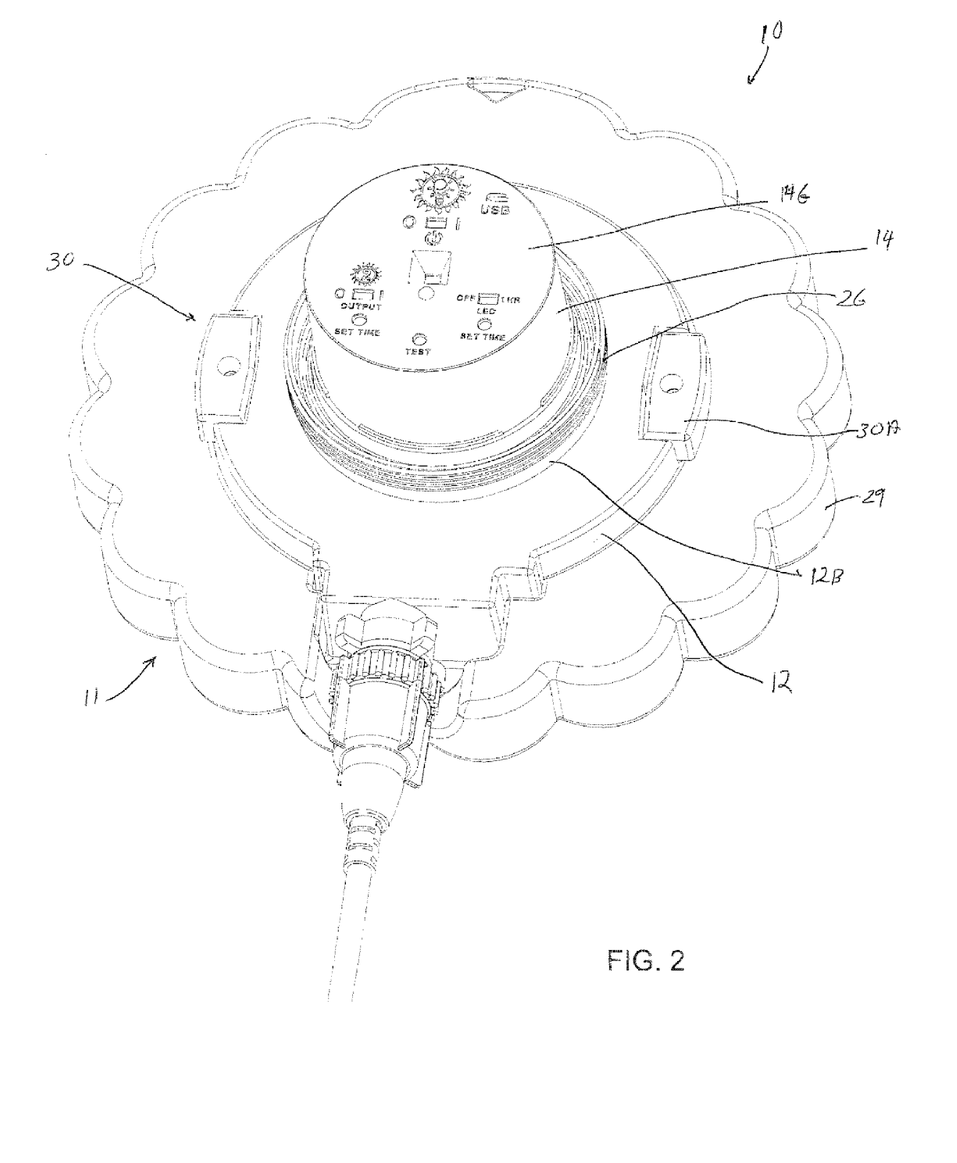
FIG. 2 is a bottom prospective view of the floating power supply of FIG. 1 with a cover removed in accordance with one aspect of the present application.
Figure 3:
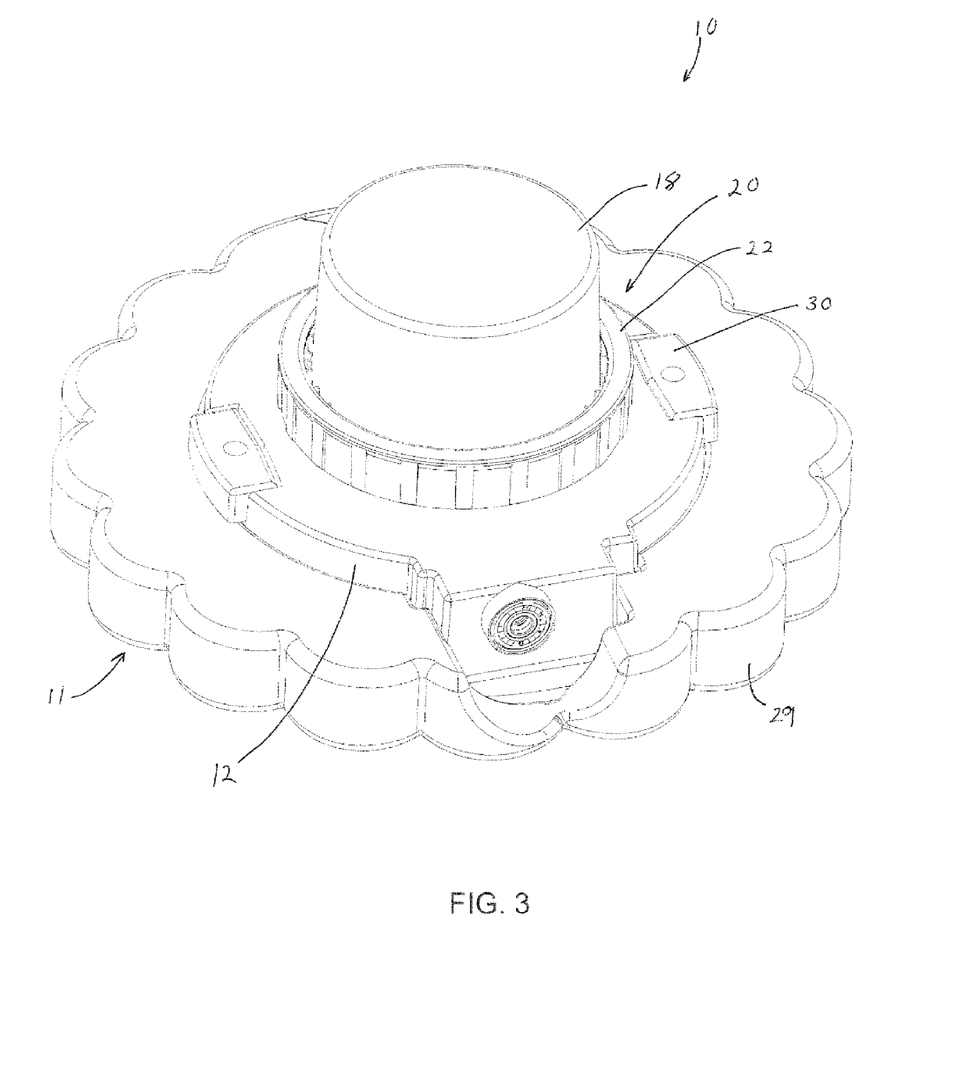
FIG. 3 is a bottom prospective view of the floating power supply of FIG. 1 with the cover on and a power cord removed in accordance with one aspect of the present application.
Figure 4:
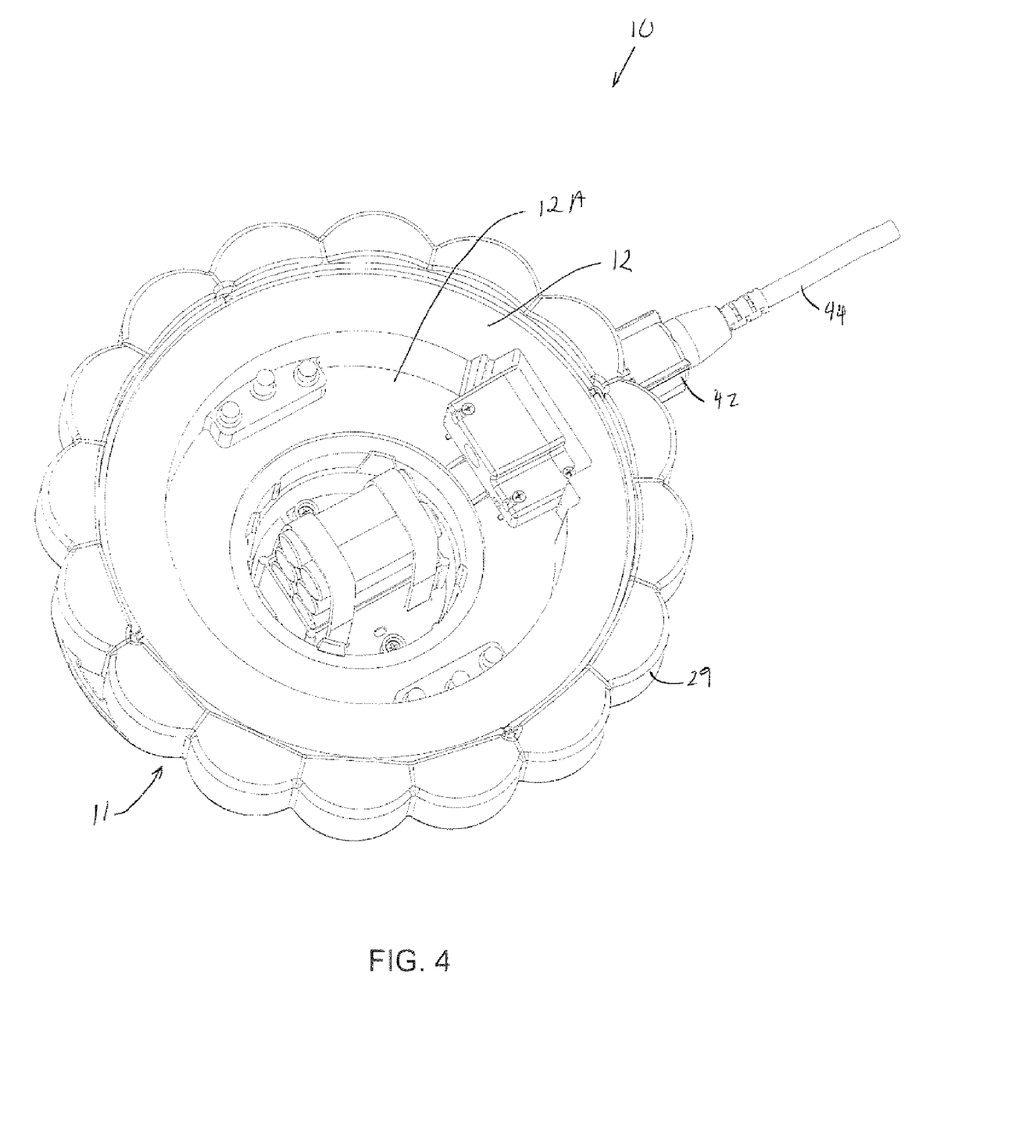
FIG. 4 is a bottom prospective view of the floating power supply of FIG. 1 showing an interior of the floating power supply in accordance with one aspect of the present application.
Figure 5:
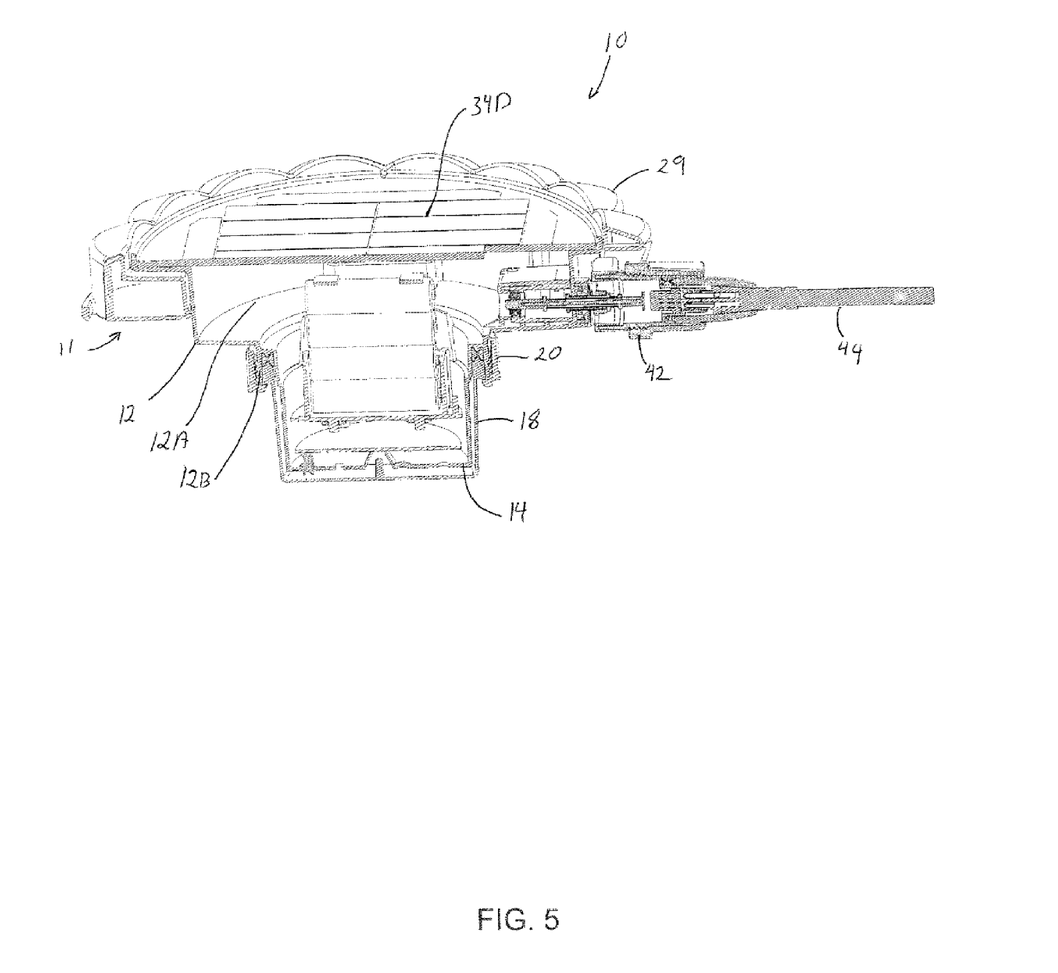
FIG. 5 is a cross-sectional side view of the floating power supply of FIG. 1 with a sub-housing removed in accordance with one aspect of the present application.
Figure 6:
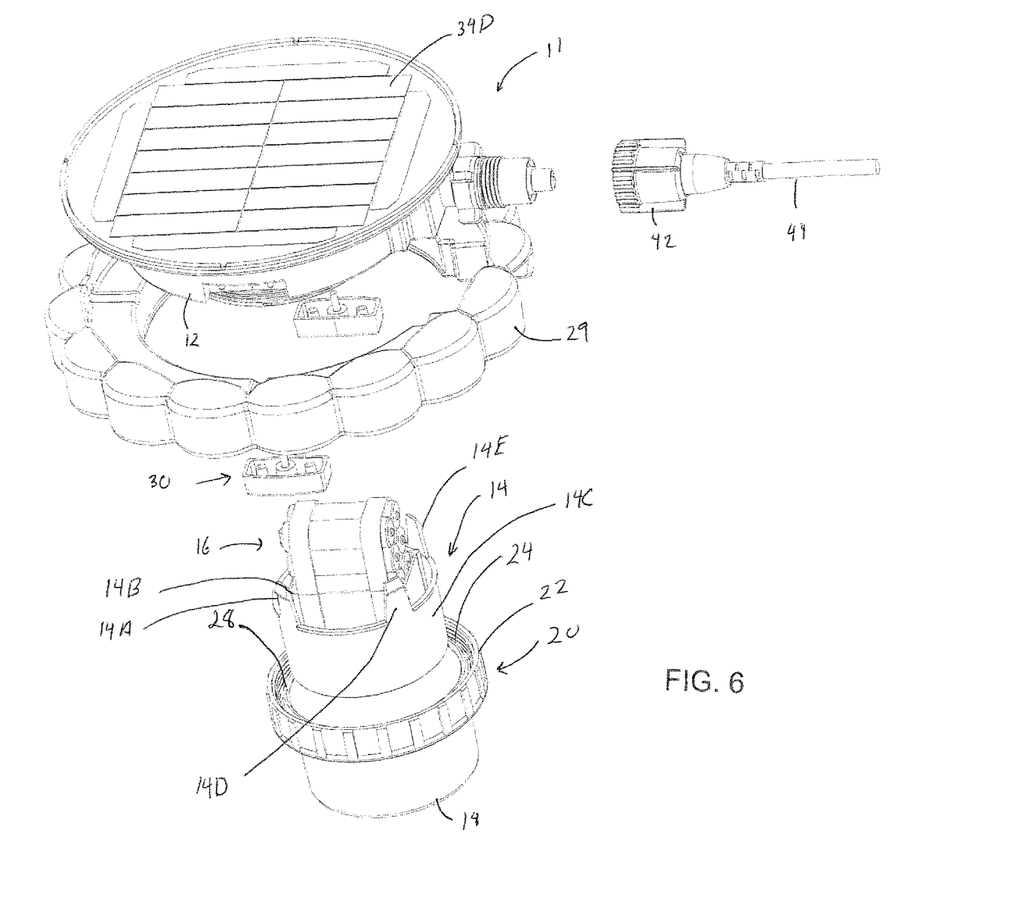
FIG. 6 is an exploded view of the floating power supply of FIG. 1 in accordance with one aspect of the present application.
Figure 7:
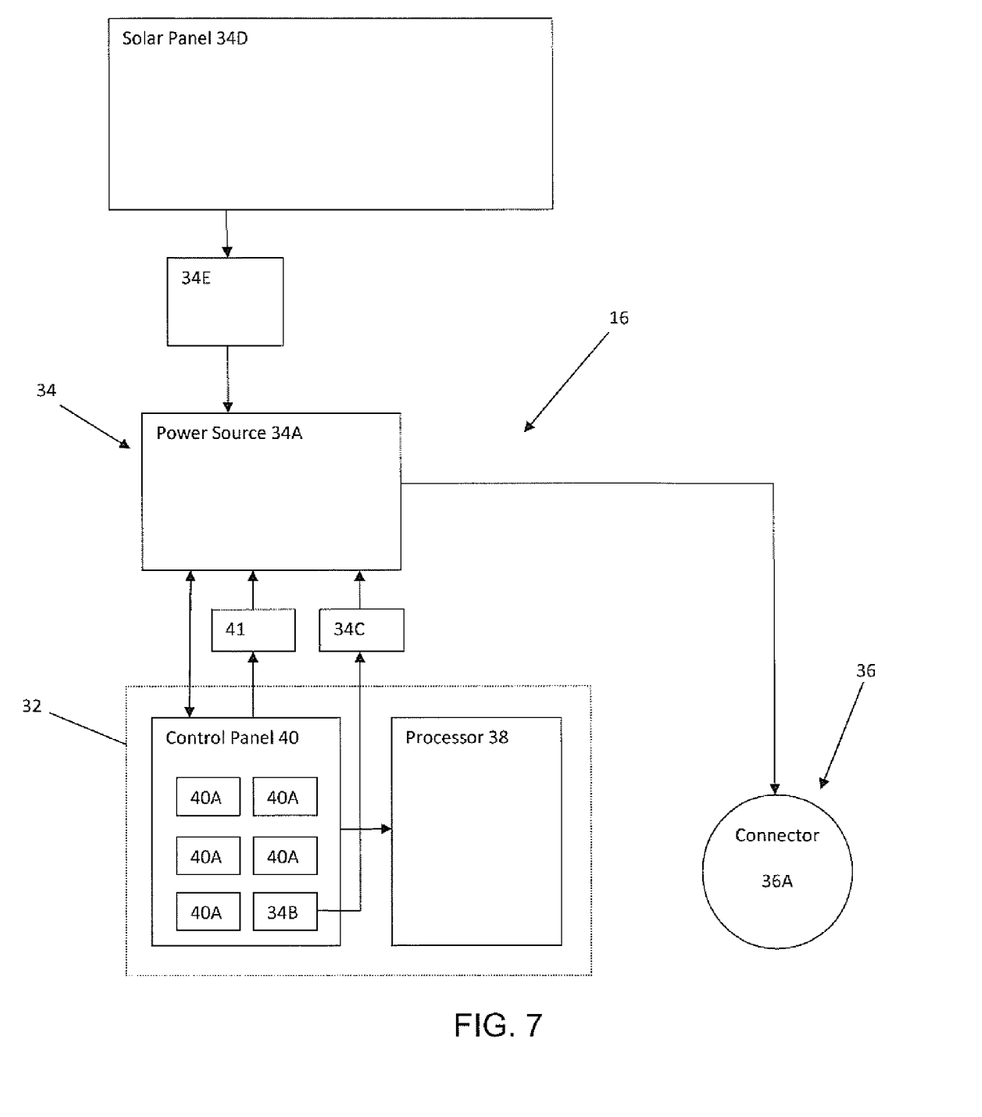
FIG. 7 is a block diagram of a power supply circuit of the floating power supply in accordance with one aspect of the present application.
Figure 8:
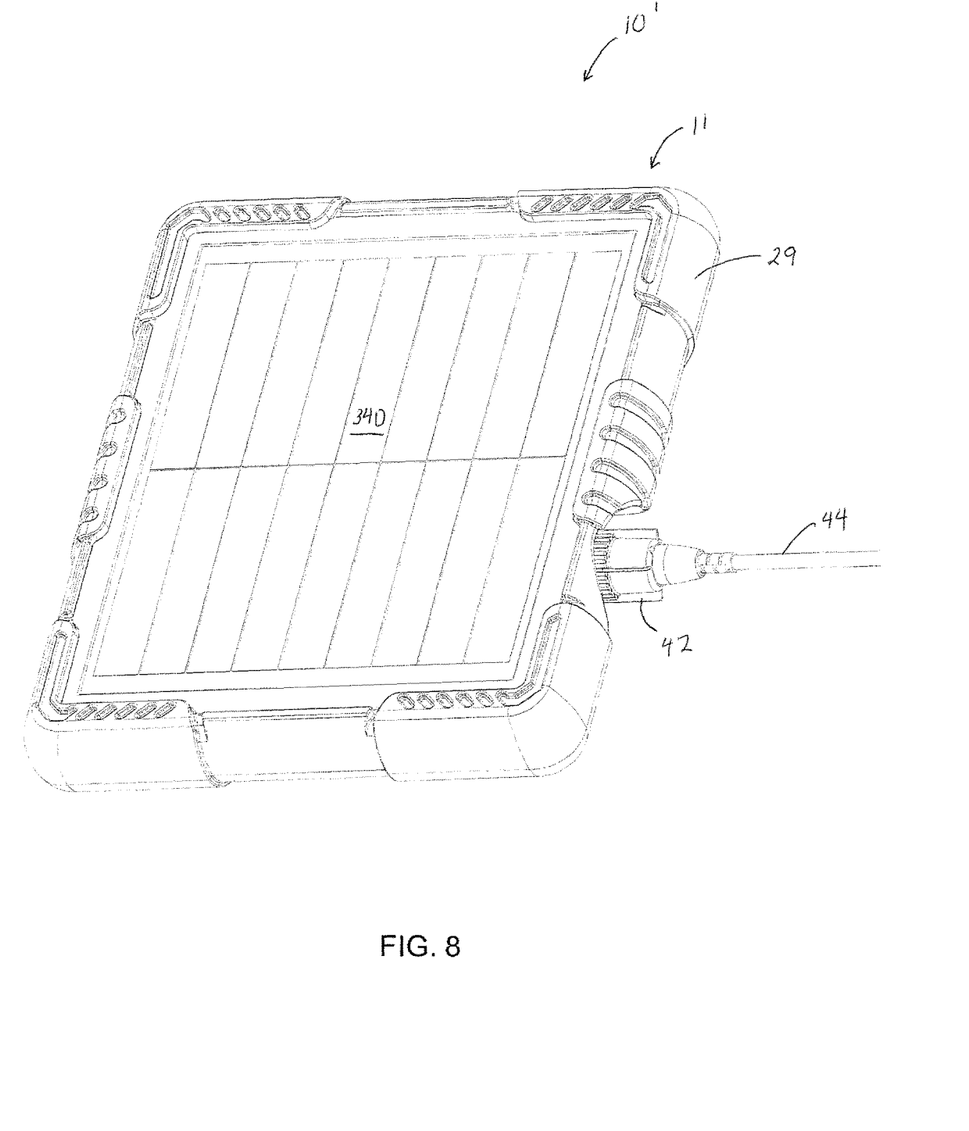
FIG. 8 is a top prospective view of a floating power supply in accordance with one aspect of the present application.
Figure 9:
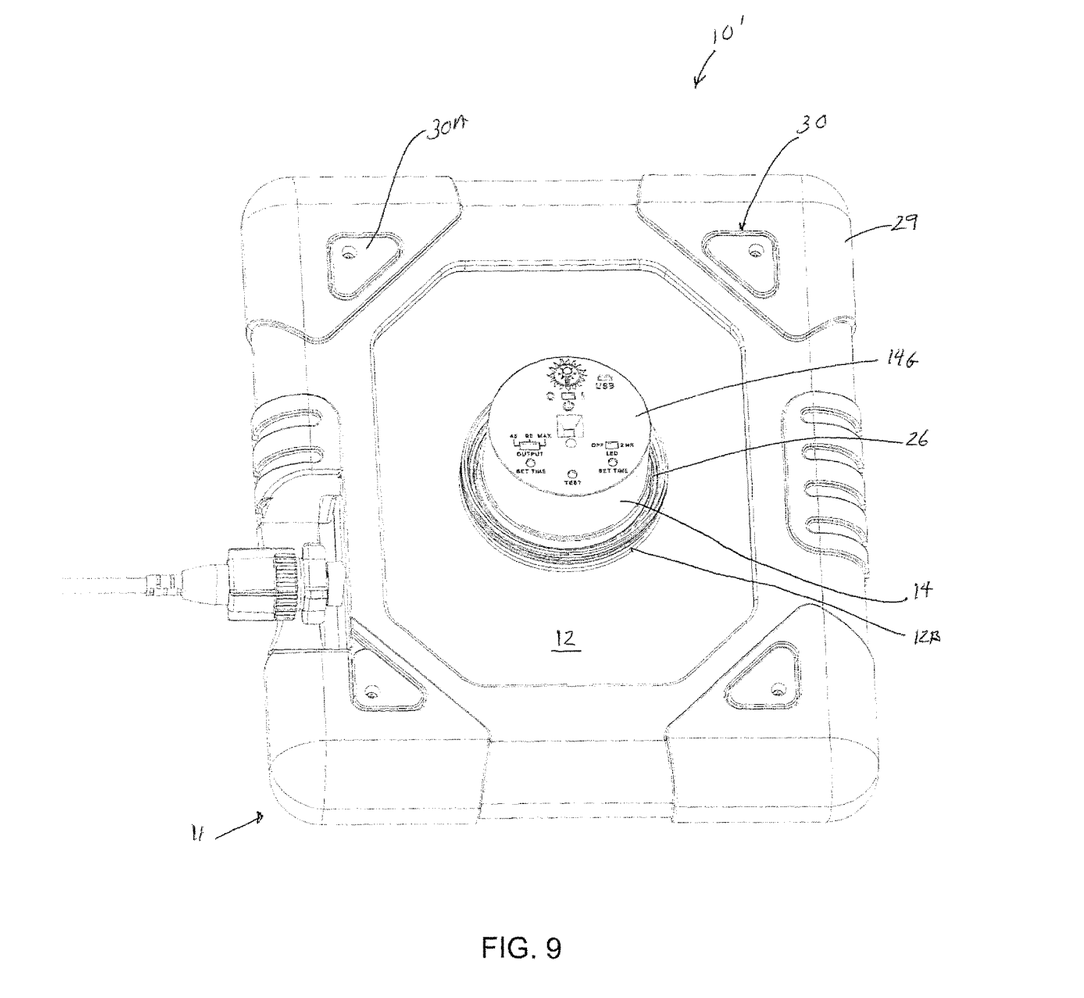
FIG. 9 is a bottom prospective view of the floating power supply of FIG. 8 with the cover removed in accordance with one aspect of the present application.
Figure 10:
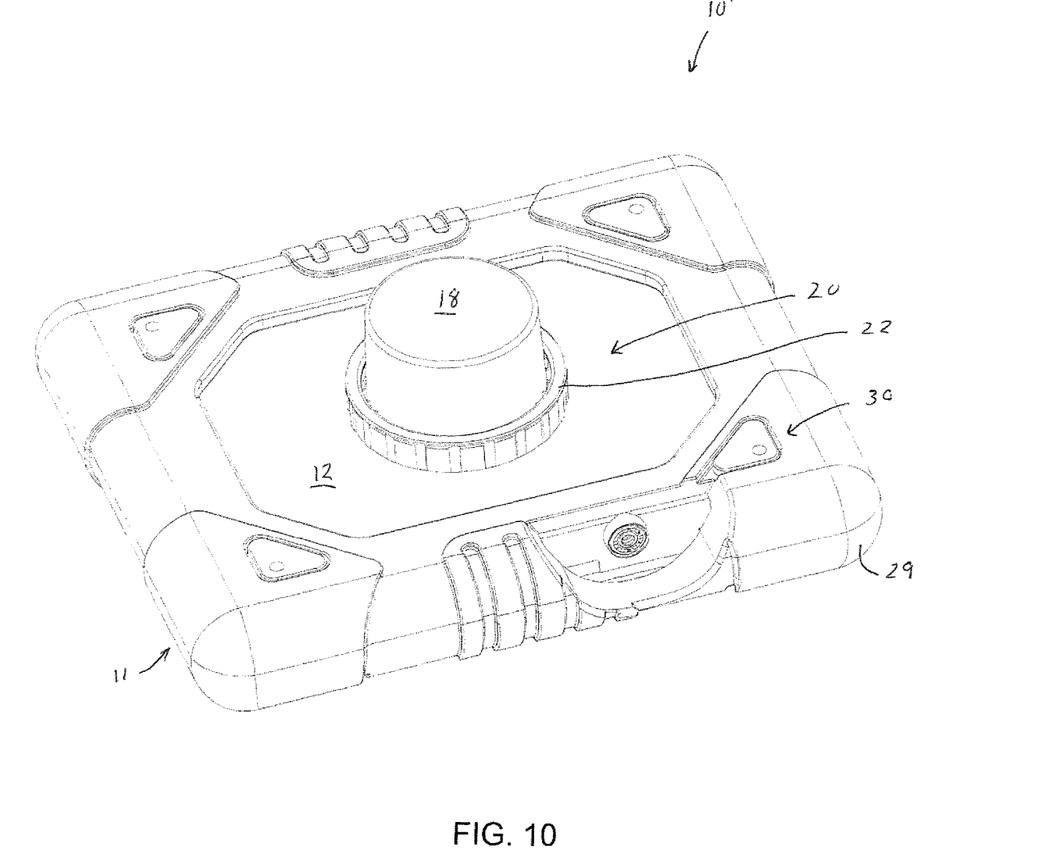
FIG. 10 is a bottom prospective view of the floating power supply of FIG. 8 with the cover on and the power cord removed in accordance with one aspect of the present application.
Figure 11:
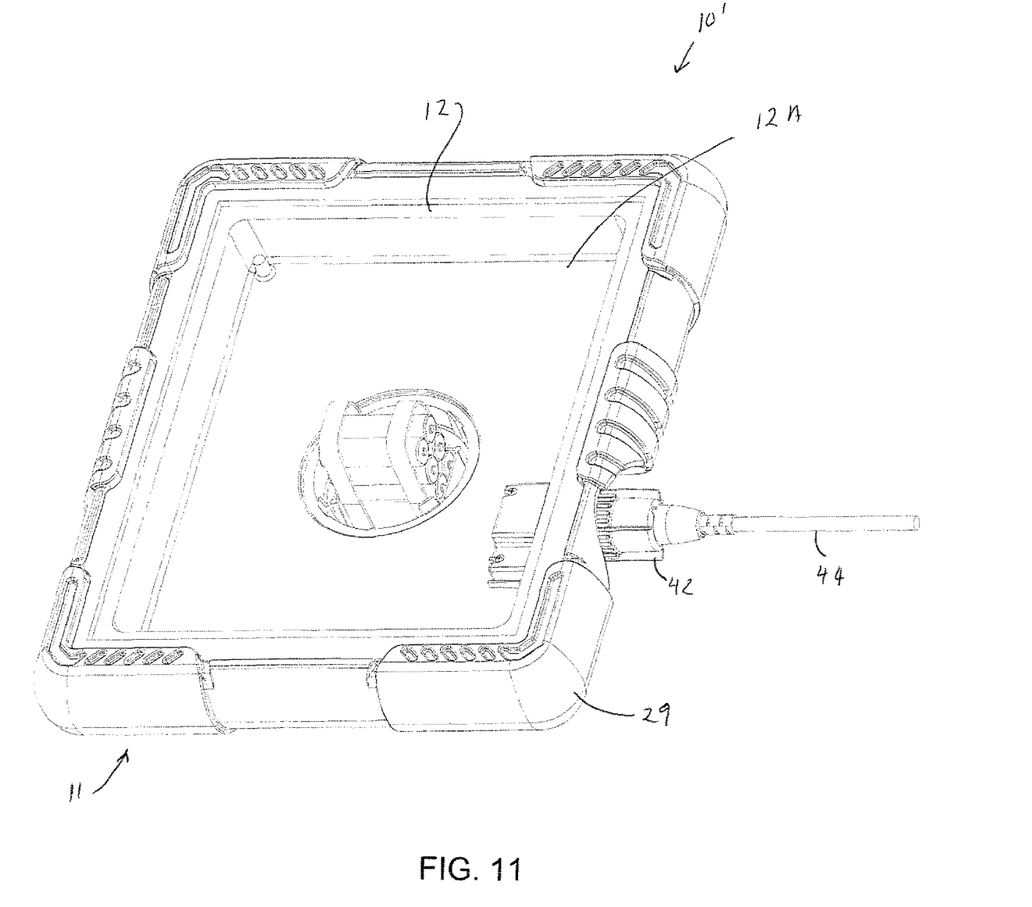
FIG. 11 is a bottom prospective view of the floating power supply of FIG. 8 showing an interior of the floating power supply in accordance with one aspect of the present application.
Figure 12:
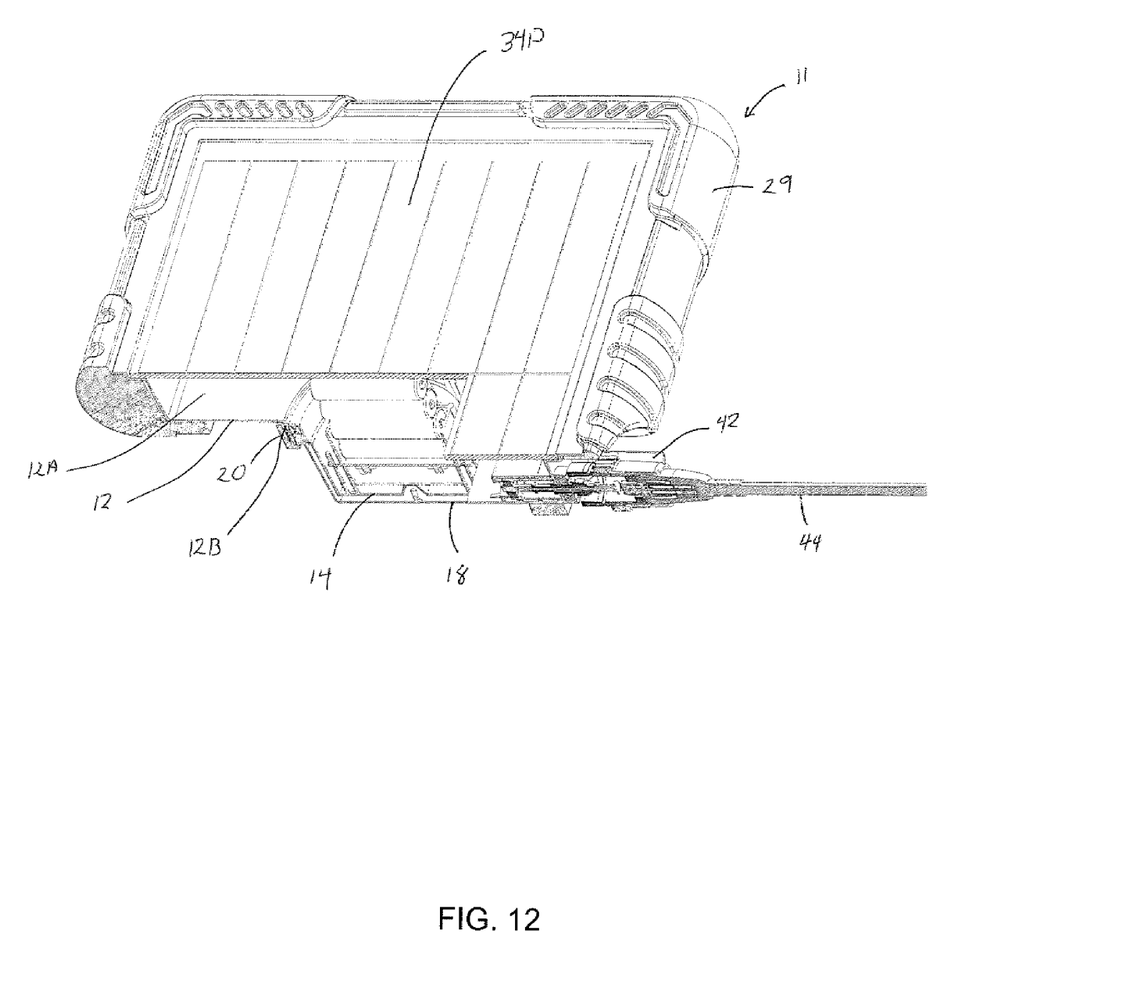
FIG. 12 is a cross-sectional side view of the floating power supply of FIG. 8 with a sub-housing removed in accordance with one aspect of the present application.
Figure 13:
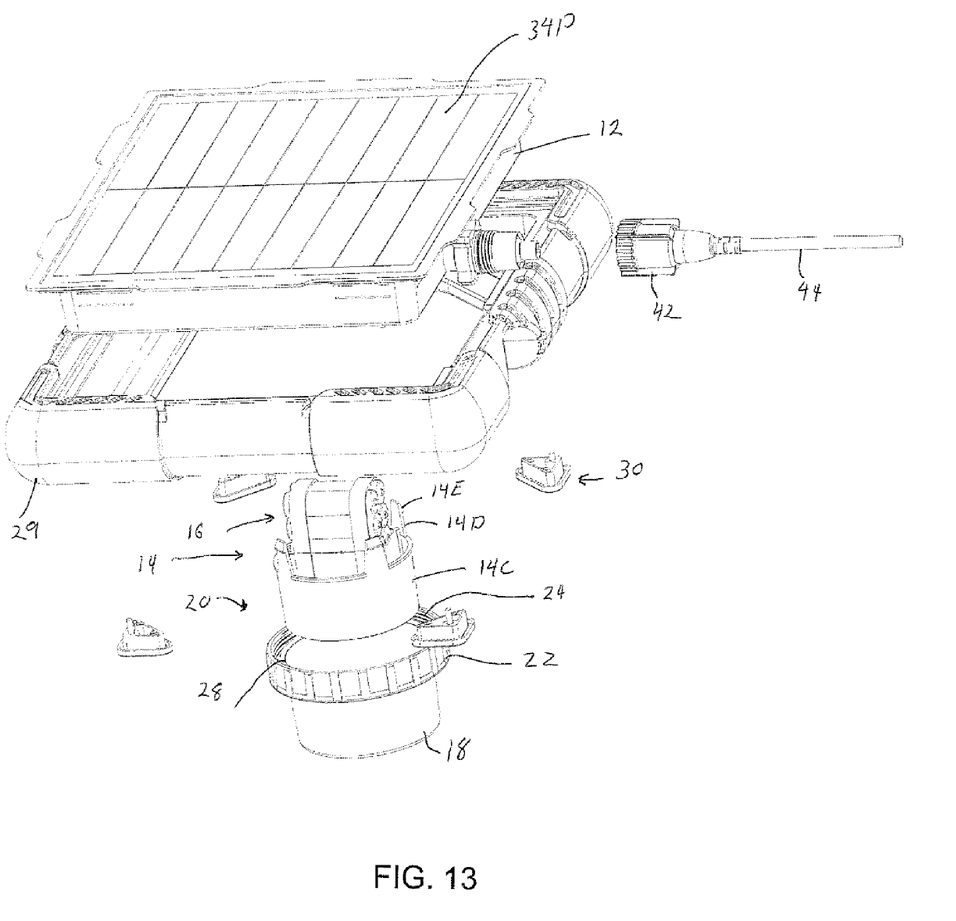
FIG. 13 is an exploded view of the floating power supply of FIG. 8 in accordance with one aspect of the present application.

Referring to FIG. 7, the power supply circuit 16 may be comprised of a control unit 32, a power supply unit 34 and an outlet 36. The outlet 36 may be formed on the housing 12. In accordance with one embodiment, the outlet 36 may be formed on the side surface 12A of the housing 12. The outlet 36 may be a waterproof/watertight outlet 36A. Thus, when a connector 42 of a power cable 44 is attached to the outlet 36, a waterproof/watertight seal may be formed.

The control unit 32 may be used to control the operation of the power supply circuit 16. The control unit 32 may be used to activate/deactivate the power supply circuit 16, set a time when the power supply circuit 16 may be activated, the duration the power supply circuit 16 may be active, regulate a voltage/current output of the power supply circuit 16 and other similar power control features. In accordance with one embodiment, the control unit 32 may be formed of a processor unit 38. The processor unit 38 may be coupled to a control panel 40. As may be seen in FIG. 2, the control panel 40 may be formed on a bottom surface 14G of the sub-housing 14. The control panel 40 may have one or more input device 40A. The input devices 40A may allow a user to enter one or more operating parameters for the power supply circuit 16. By setting the operating parameters, the control panel 40 indicates to the processor 38 how to control operation of the power supply circuit 16. For example, the user may set a time for when the power supply circuit 16 should be active and release stored energy. The user may set the duration for the power supply circuit 16 to release the stored energy as well as the voltage/current level of the stored energy being dissipated. The above is given as examples and should not be seen in a limiting manner.

A power supply unit 34 is coupled to the control unit 32 and to the outlet 36. The power supply unit 34 may be used to supply power to the floating power supply 10. The power supply unit 34 may be comprised of a power source 34A. In accordance with one embodiment, the power source 34A may be a rechargeable battery pack. If the power source 34A is rechargeable, the power supply unit 34 may have a charging port 34B. The charging port 34B may be used to plug the power source 34A to a recharging source. In the embodiment show, the charging port 34B may be located on the control panel 40. An AC-DC converter 34C may be used to convert AC power from the recharging source to DC power for recharging the rechargeable power source 34A.

Alternatively, or in addition to the charging port 34B, the power supply unit 34 may have a solar panel 34D. The solar panel 34D may be coupled to a top surface of the housing 12. In accordance with one embodiment, a ridge 12C may be formed around a top surface of the housing 12. The solar panel 34D may be positioned and held within the ridge 12C. The solar panel 34D may be used to convert energy from the sun to electrical energy for charging the power supply unit 34. A voltage regulator 34E may be used to adjust the voltage generated by the solar panel 34D to the proper level for charging the power supply unit 34.

The power supply circuit 16 may have an output regulator 41. The output regulator 41 may be coupled to the control panel 40 and the power supply unit 34. The output regulator 41 may allow one to control the output current/voltage supplied by the power supply unit 34 to the connector 36. In accordance with one embodiment, one may use the input devices 40A to enter one or more operating parameters into the control panel 40 so that the output regulator 41 may control the output current/voltage supplied by the power supply unit 34 to the connector 36.

Referring to FIGS. 8-13, another embodiment of the floating power supply 10' may be seen. The floating power supply 10' is similar to previous embodiments but has a different geometrical configuration. The floating power supply 10' may have a flotation unit 11. The flotation unit 11 may be configured to float on a top surface of water within a swimming pool or other water feature. The flotation unit 11 have a housing 12. The housing 12 may be configured to float on a top surface of the water. The housing 12 may have a hollow interior section 12A which may provide the buoyancy to keep the power supply 10 afloat. In the present embodiment, the housing 12 is cubical in shape, however this is shown as an example and should not be seen in a limiting manner. A tubular member 12B may extend down from a central bottom area of the housing 12. The tubular member 12B may provide access to the interior section 12A of the housing 12.

A sub-housing 14 may be coupled to the housing 12. In accordance with one embodiment, the sub-housing 14 may be coupled to the distal end of the tubular member 12B. The sub-housing 14 may be used to store and hold a power supply circuit 16. The sub-housing 14 may have a bottom surface 14G. Sidewalls 14C extend up from the bottom surface 14G forming a hollow interior area 14B having an open top surface 14A. A plurality of leg members 14D may rise up from a top edge of a sidewall 14C forming part of the sub-housing 14. At a distal end of each leg member 14D is a tab member 14E that extends away from the interior area 14B of the sub-housing 14. When securing the sub-housing 14 to the distal end of the tubular member 12B, the leg members 14D may extend up into an interior of the tubular member 12B. The tab member 14E may engage a bottom surface of the housing 12 where the tubular member 12B extends down from the central bottom area of the housing 12 securing the sub-housing 14 to the tubular member 12B of the housing 12.

A cover 18 may be formed around the sub-housing 14. The cover 18 may be used to prevent water from entering into the sub-housing 14 thereby protecting the power supply circuit 16 from damage. The cover 18 may be similar in shape to the sub-housing 14 but having a wider perimeter to fit around the sub-housing 14.

A securing device 20 may be used to attach the cover 18 to the tubular member 12B of the housing 12. The securing device 20 may form a watertight seal thereby preventing water from entering into the area between the cover 18 and the sub-housing 14. In accordance with one embodiment, the securing device 20 may be formed of a collar 22. The collar 22 may have threading 24 formed around an inner perimeter thereof. The threading 24 may engage threading 26 formed on an outer perimeter of the tubular member 12B of the housing 12 thereby securing the cover 18 to the tubular member 12B of the housing 12. A gasket 28 may be positioned between the tubular member 12B and the sub-housing 14. The gasket 28 may be used to prevent leakage from or into the area between the cover 18 and the sub-housing 14.

A flotation device 29 may be formed around the housing 12. The flotation device 29 may enhance the ability of the housing 12 and hence the illumination device 10 to float. The flotation device 29 may be an air bladder or similar device formed around an outer perimeter of the housing 12. In the present embodiment, the flotation device 29 may take a form of a cubical ring. However, this is shown as an example and should not be seen in a limiting manner. One or more attachment devices 30 may be used to secure the flotation device 28 to the housing 12. The attachment device 30 may be locking blocks 30A, screws or similar devices.

The foregoing description is illustrative of particular embodiments of the application, but is not meant to be a limitation upon the practice thereof. The following claims, including all equivalents thereof, are intended to define the scope of the application.

What is claimed is:

1. A floating power supply for a body of water comprising:
   a flotation unit; and
   a power supply circuit housed within the flotation unit, wherein the power supply circuit provides power to a device within the body of water while untethered to a power supply source external of the body of water.

2. The floating power supply of claim 1, wherein the power supply circuit comprises:
   a control panel attached to the flotation unit;
   a controller coupled to the control panel and housed with the flotation unit;
   a power supply unit coupled to the controller and housed within the flotation unit; and
   an outlet coupled to the power supply unit and attached to the flotation unit;
   wherein an output of the outlet is regulated by the power supply circuit.

3. The floating power supply of claim 2, wherein the outlet is waterproof.

4. The floating power supply of claim 2, wherein the power supply unit comprises:
   a rechargeable battery;
   a solar panel attached to a top surface of the flotation unit; and
   an output regulator coupled to the controller and the outlet regulating the output of the outlet.

5. The floating power supply of claim 4, wherein the power supply unit comprises:
   a charging port formed on the control panel; and
   an AC/DC converter coupled to the charging port and the rechargeable battery.

6. The floating power supply of claim 1, wherein the flotation unit comprises:
   a housing having a sub-housing extending down from a bottom section of the housing;
   a cover positioned over the sub-housing forming a watertight seal;
   a flotation device formed around a perimeter of the housing;
   a tubular member extending down from the housing and in communication with an interior of the housing; and
   a securing device attaching the cover to the tubular member forming a watertight seal.

7. The floating power supply of claim 6, wherein the securing device comprises:

a collar having threading formed around an inner perimeter thereof; and tubular member threading formed on an outer perimeter of the tubular member, the threading of the collar engaging the tubular member threading attaching the cover to the tubular member.

8. The floating illumination device of claim 7, wherein the securing device comprises a gasket positioned between the tubular member and the sub-housing.

9. The floating illumination device of claim 6, wherein the sub-housing comprises:
a bottom surface;
sidewalls extending up from the bottom surface;
a plurality of leg members extending up from a top end of the sidewalls; and
a tab member extending out and away from a top surface of at least one of the plurality of leg members.

10. A floating power supply for a body of water comprising:
a flotation unit; and
a power supply circuit housed within the flotation unit, wherein the power supply circuit provides power to a device within the body of water while untethered to a power supply source external of the body of water, wherein the power supply circuit comprises:
a control panel attached to the flotation unit;
a controller coupled to the control panel and housed with the flotation unit;
a power supply unit coupled to the controller and housed with the flotation unit, wherein an output of the power supply circuit is regulated, the power supply unit having a rechargeable power supply; and
a waterproof outlet coupled to the power supply unit and to the flotation unit.

11. The floating power supply of claim 10, wherein the power supply unit comprises:
a rechargeable battery;
a solar panel attached to a top surface of the flotation unit; and
an output regulator coupled to the controller and the outlet.

12. The floating power supply of claim 11, wherein the power supply unit comprises:
a charging port formed on the control panel; and
an AC/DC converter coupled to the charging port and the rechargeable battery.

13. The floating power supply of claim 10, wherein the flotation unit comprises:
a housing having a sub-housing extending down from a bottom section of the housing;
a cover positioned over the sub-housing forming a watertight seal;
a flotation device formed around a perimeter of the housing;
a tubular member extending down from the housing and in communication with an interior of the housing; and
a securing device attaching the cover to the tubular member forming a watertight seal.

14. The floating power supply of claim 13, wherein the securing device comprises:
a collar having threading formed around an inner perimeter thereof; and
tubular member threading formed on an outer perimeter of the tubular member, the threading of the collar engaging the tubular member threading attaching the cover to the tubular member.

15. The floating illumination device of claim 14, wherein the securing device comprises a gasket positioned between the tubular member and the sub-housing.

16. The floating illumination device of claim 13, wherein the sub-housing comprises:
a bottom surface;
sidewalls extending up from the bottom surface;
a plurality of leg members extending up from a top end of the sidewalls; and
a tab member extending out and away from a top surface of at least one of the plurality of leg members.

17. A floating power supply comprising:
a housing having a sub-housing extending down from a bottom section of the housing;
a tubular member extending down from the housing and in communication with an interior of the housing;
a cover positioned over the sub-housing forming a watertight seal;
a securing device attaching the cover to the tubular member forming the watertight seal;
a flotation device formed around a perimeter of the housing; and
a power supply circuit positioned within housing, wherein the power supply circuit provides regulated power to a device within the body of water while untethered to a power supply source external of the body of water, the power supply circuit having a rechargeable power supply.

18. The floating power supply of claim 17, wherein the power supply circuit comprises:
a control panel attached to the sub-housing;
a controller coupled to the control panel and stored within the housing;
a power supply unit coupled to the controller and stored with the housing; and
a waterproof outlet coupled to the power supply unit and positioned on a side surface of the housing, wherein an output of the waterproof outlet is regulated.

19. The floating power supply of claim 18, wherein the power supply unit comprises:
a rechargeable battery;
a solar panel attached to a top surface of the flotation unit; and
an output regulator coupled to the controller and the outlet.

20. The floating power supply of claim 19, wherein the power supply unit comprises:
a charging port formed on the control panel; and
an AC/DC converter coupled to the charging port and the rechargeable battery.

* * * * *